(12) United States Patent
Burns et al.

(10) Patent No.: US 7,826,406 B2
(45) Date of Patent: Nov. 2, 2010

(54) STORING, SENDING AND RECEIVING TEXT MESSAGE THREADS ON A WIRELESS COMMUNICATION DEVICE

(75) Inventors: Anthony G. Burns, Waterloo (CA);
Darrell R. May, Waterloo (CA);
Michael T. Hardy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 635 days.

(21) Appl. No.: 11/113,306

(22) Filed: Apr. 25, 2005

(65) Prior Publication Data

US 2006/0239221 A1    Oct. 26, 2006

(51) Int. Cl.
*H04W 4/00*    (2009.01)
(52) U.S. Cl. ............ 370/328; 455/412.1; 455/466; 455/566; 715/752; 370/338; 370/310
(58) Field of Classification Search .......... 370/328; 455/412.1; 715/752
See application file for complete search history.

(56) References Cited

U.S. PATENT DOCUMENTS

| 6,807,570 | B1 * | 10/2004 | Allen et al. ............... 709/219 |
| 7,110,510 | B1 * | 9/2006 | Shaffer et al. ........... 379/88.25 |
| 2003/0114174 | A1 | 6/2003 | Walsh et al. |

FOREIGN PATENT DOCUMENTS

| WO | WO 2004/077770 A1 | 9/2004 |
| WO | WO 2004077770 A1 * | 9/2004 |

* cited by examiner

*Primary Examiner*—Huy Phan
*Assistant Examiner*—Chuck Huynh
(74) *Attorney, Agent, or Firm*—Mukundan Chakrapani; Borden Ladner Gervais LLP

(57) ABSTRACT

A mobile communication device uses a condensed text message store wherein individual messages of a thread are stored in such a manner that the thread can later be reconstructed for display. By storing individual messages rather than thread objects including duplicative content, device memory is conserved. Network bandwidth can also be preserved by sending only individual messages between the device and a central server (which server may also utilize a condensed message store).

12 Claims, 7 Drawing Sheets

CONDENSED MESSAGE STORE

| Sequential Msg. # | (Delta) Msg. Text | Ref. ID Thread Up | Ref. ID Thread Down | (Delta) Header Data |
|---|---|---|---|---|
| 1 | xxxx ... x |  | 3 | XX ... XX ... |
| 2 | yyy ... yy |  | 4 | YY ... YY ... |
| 3 | zz ... zz | 1 | 5 | ZZ ... ZZ ... |
| 4 | aa ... aa | 2 | 6 | AA ... AA ... |
| 5 | bb ... bb | 3 |  | BB ... BB ... |
| 6 | cc ... cc ... | 4 | 7 | CC ... CC ... |
| 7 | dd ... dd ... | 6 | 8 | DD ... DD ... |
| . | . | . | . | . |

*Fig. 3*

CONDENSED MESSAGE STORE

| Sequential Msg. # | (Delta) Msg. Text | Thread ID | (Delta) Header Data |
|---|---|---|---|
| 1 | xxx ... xx | 1 | XX ... XX ... |
| 3 | zzz ... zz | 1 | ZZ ... ZZ ... |
| 5 | bb ... bb | 1 | BB ... BB ... |
|  |  |  |  |
| 2 | yyy ... yy | 2 | YYY ... YY |
| 4 | aaa ... aa | 2 | AAA ... AA |
| 6 | ccc ... cc | 2 | CCC ... CC ... |
| 7 | ddd ... dd | 2 | DDD ... DD ... |
| 8 | . | . | . |

*Fig. 4*

CONDENSED MESSAGE STORE

| Sequential Msg. # | (Delta) Msg. Text | Ref. ID Thread Up | Ref. ID Thread Down | (Delta) Header Data |
|---|---|---|---|---|
| 1 | xxxx . . . x |  | 2 | XX . . . XX . . . |
| 2 | yyy . . . yy | 1 | 3,4 | YY . . . YY . . . |
| 3 | zz . . . zz | 2 | 7 | ZZ . . . ZZ . . . |
| 4 | aa . . . aa | 2 | 5,6 | AA . . . AA . . . |
| 5 | bb . . . bb | 4 |  | BB . . . BB . . . |
| 6 | cc . . . cc . . . | 4 |  | CC . . . CC . . . |
| 7 | dd . . . dd . . . | 3 |  | DD . . . DD . . . |
| . | . | . | . | . |
| . | . | . | . | . |
| . | . | . | . | . |

STORING, SENDING AND RECEIVING TEXT MESSAGE THREADS ON A WIRELESS COMMUNICATION DEVICE

BACKGROUND

1. Technical Field

This application generally relates to mobile wireless communication devices capable of storing, sending and receiving text messages that can be part of a thread of related messages exchanged between multiple parties.

2. Related Art

Wireless communication devices of various types and configurations are now common place. Many of these devices are capable of sending, storing and receiving text messages between two or more people which constitute a form of conversation between them about a given topic (or which possess some other common feature which causes a series of such individual messages to be interrelated, e.g., such as question and answer, further question, further answer, etc.). Such sequences of related individual messages are commonly referred to as a "thread" of interrelated messages.

For continuity, typically each exchange in such a thread of messages includes the cumulative earlier original message and all interrelated subsequent earlier replies as a part of the next or current message. That is, a thread of messages is typically treated as an object entity which means that the size of the object continually increases as the thread continues to grow.

In systems where a central message control server may have its own store of prior communicated message objects, it has been recognized that communication bandwidth may be economized by having the wireless device transmit only an abbreviated individual reply or forward message command to the server where the entire message thread object to be included with the reply or forward can be reconstructed. For example, see our copending application Ser. No. 11/002,583 filed Dec. 3, 2004 entitled METHOD AND APPARATUS FOR EFFICIENTLY MANAGING "MESSAGES SENT" FILE AND RESENDING OF MESSAGES FROM MOBILE WIRELESS COMMUNICATION DEVICE. If economy is attempted in the other direction by sending only an individual message of a thread from the server to the wireless device, then a MORE command may be issued if additional messages in the thread are needed at the wireless device.

However, at present, all messages, on at least some devices, are received, stored and sent as independent objects. Message threads (e.g., groups of emails on the same subject) are correlated on the device, but no mechanism is used to compress the redundant data included in each subsequent message on that thread or in the local memory required to store such message thread objects. Even if the server "knows" that the device already has particular messages stored thereat, there has in the past been no reliable mechanism to tell the device to use some earlier message (e.g., an "original message") as part of the current message, (similar to how message replies and forwards from the device may be reconstructed at the server). Further, when MORE is requested from one message in the thread, that data will not appear when looking at a subsequent reply to that thread.

The current method leads to several inefficiencies, e.g.:
a) data storage is redundant (i.e., in most cases only the reply/forward text is required, not the original text);
b) requesting MORE on the original message (or on any reply within that thread) does not also update the display of any other message within that thread; and
c) transmission bandwidth required for sending message threads from the server to the device are significantly greater than necessary (e.g., if the server were to transmit only a reference to an original message which it knows that the device already has).

BRIEF DESCRIPTION OF THE DRAWINGS

These and other objects and advantages will be more completely understood and appreciated by careful study of the following more detailed description of at least one exemplary embodiment in conjunction with the accompanying drawings, in which:

FIGS. 3 and 4 are exemplary abbreviated schematic depictions of two possible condensed message store organizations and/or contents, it being understood that there are a great number of possible such organizations and/or contents;

DETAILED DESCRIPTION OF EXEMPLARY EMBODIMENTS

Figure 1:
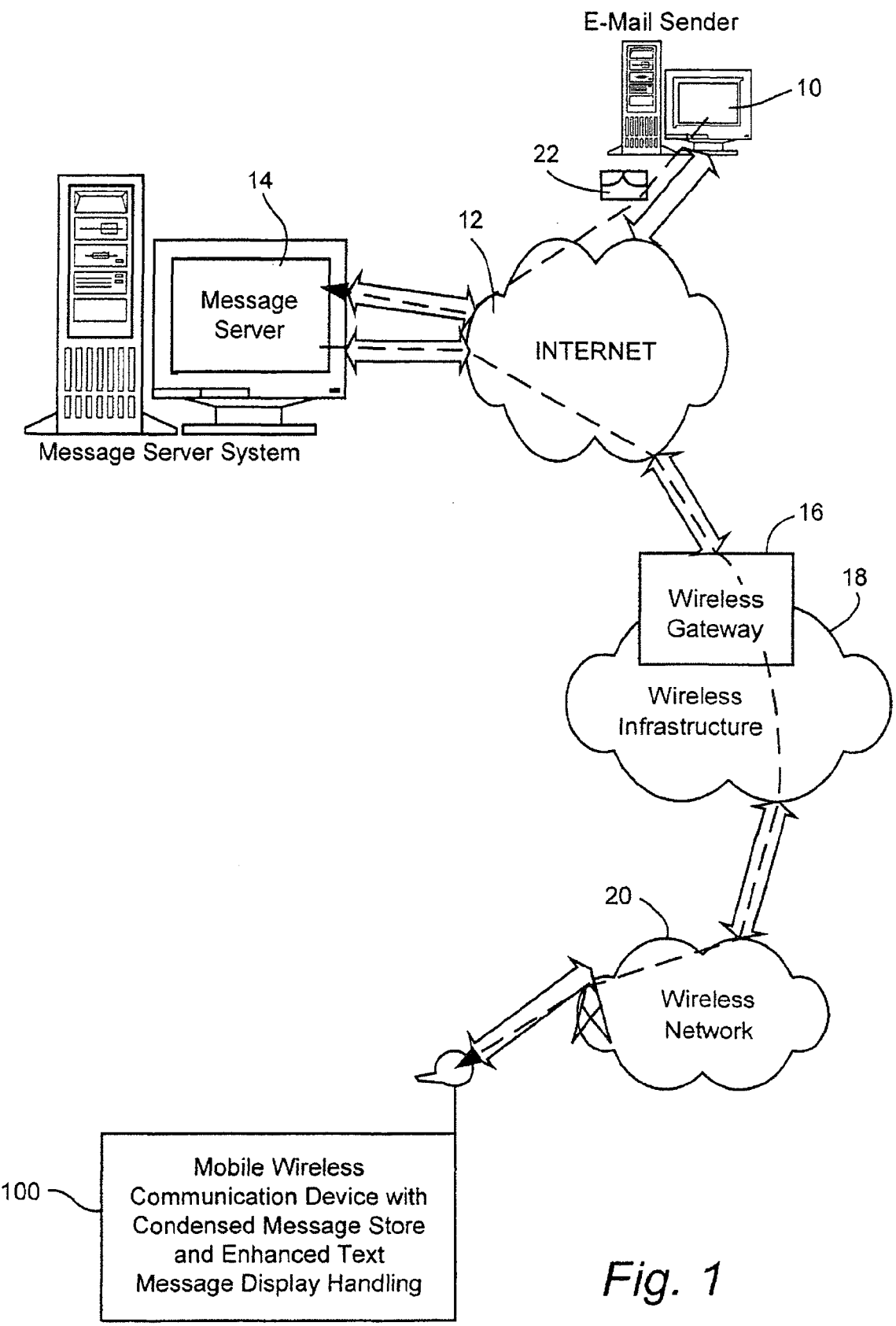
FIG. 1 is an overall system wide schematic view of an exemplary wireless email communication system incorporating a mobile wireless communication device with enhanced text message handling capability in accordance with one exemplary embodiment.

An exemplary mobile communication device is capable of sending, receiving and displaying text messages that each may be one of a thread of related messages between two or more parties. The exemplary mobile communication device may include a condensed message store including individual messages stored in such a manner as to uniquely identify each with an associated message thread and its relative location or sequence within that thread. Message display logic functionally linked to the condensed message store can then operate to sequentially link together for display of individually stored messages in the thread.

In one embodiment, the message display logic operates to automatically locate and sequentially link together for display all other messages in a thread when any one message of the thread is selected for display. In another embodiment, the message display logic may operate in response to a user input so as to locate and sequentially link together for display fewer (e.g., one) messages in the same thread for display.

There are numerous ways in which the condensed message store may be organized. For example, the condensed message store may include thread reference data for each individual message identifying at least one of: (a) thread membership and (b) sequence within a thread. Such thread reference data for each individual message may identify both thread membership and sequence within that thread. Furthermore, to facilitate similar efficiencies at the server, the device message sending logic may send a new message as part of a thread by sending, at least initially, only that new individual message together with sufficient thread reference data to identify at least its thread membership.

By using thread reference ID's to earlier messages of the same thread, links can be created on the device to the original messages, if they exist. If not, the device can use prior MORE methods for creating that original message on the device from the server. As such, each message within a thread can be linked together, but only the delta data (e.g., the reply text) is saved with that message, along with a link or thread reference ID to the just earlier message in that thread. In this way, when rendered on the display, the message can appear to already have the entire thread in it.

If a MORE request is issued on any message within the message thread, then the server response can automatically update the device with all messages within that thread, since they are all linked together. Each message original text only needs to be stored, sent and/or received once, saving both device data storage and network bandwidth.

The exemplary embodiment extends a prior method (used to send replies and forwards efficiently to the server) to sending message threads to the device. This solution is, however, different in that, for example, the mechanism is extended to messages sent by the server and received by the device. Further, it defines an efficient new method for storing and retrieving message threads. The server may also employ a condensed message store to similarly save server memory.

The disclosed structure(s) may be embodied in hardware, software or a combination of hardware and software and also provide a method for storing, sending and receiving text messages in a wireless communication device including more efficient storing and retrieving message threads. The exemplary embodiment is realized at least in part, by executable computer program code which may be embodied in physical program memory media.

FIG. 1 is an overview of an exemplary communication system in which a wireless communication device 100 may be used. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SM), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer which belongs to the user of a mobile device 100 are redirected from the message server 14 to the mobile device 100 as they are received.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used through out the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks (2) the Group Special Mobile or the Global System for Mobile Communications (GSM) and the General Packet Radio Service (GPRS) networks, and (3)

future third-generation (3G) networks like Enhanced Datarates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
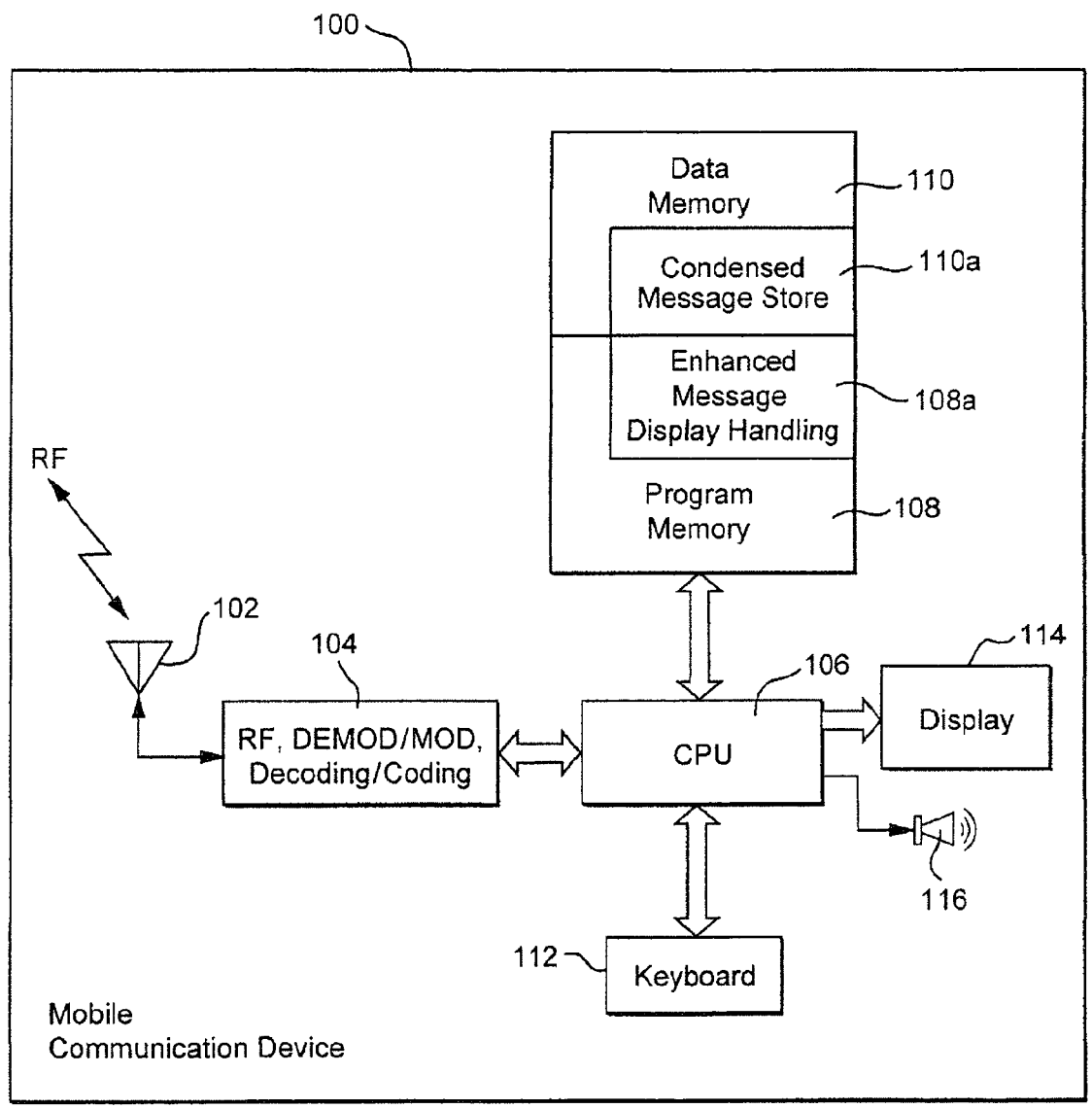
FIG. 2 is an abbreviated schematic diagram of hardware included within an exemplary mobile wireless communication device.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of data memory 110a is available for storing text message data in a condensed message store. Suitable computer program executable code is stored in portions of program memory 108a to constitute the enhanced text message display handling logic described below.

In FIG. 3 depicts one possible condensed message store wherein the incremental message text (i.e., the "Delta" message text) is sequentially stored as it becomes available together with a message sequence number, a reference ID in the up-thread direction, a reference ID in the down-thread direction and possibly even only incremental changes to the header data associated with each message in a thread. In this arrangement, each incremental message within all threads is only stored once. However, when any one of those messages is selected for display, there is sufficient associated memory organization and/or data to locate all other messages in that same thread. For example, if one looks at sequential message No. 5 in FIG. 3, it will be seen that there is no reference ID in the down-thread direction—meaning that this is the last incremental message in a thread. However, there is an up-thread reference ID to earlier sequential message No. 3 thus identifying it as the next upward member of that particular thread. Similarly, message sequence No. 3 includes a down-thread reference ID to message No. 5 and an up-thread reference ID to message No. 1—thus identifying message No. 1 as another member of the thread. The entry for message No. 1 has no reference for any additional up-thread reference ID thus indicating that this was an original starting member for this particular thread. However, it does have a down-thread reference ID to message No. 3.

FIG. 4 shows a different (but equivalent) condensed message store organization and contents. Here, messages in a common thread simply share a common thread identification number. The relative sequence of messages within a thread is either inherently known from memory storage sequence locations or from stored sequential message numbers such as those depicted in FIG. 4.

Of course, those skilled in the art will realize that there are many other ways to organize a condensed message store so as to minimize storage space by storing incremental message text only once but with sufficient memory storage organization and/or stored reference data to permit identification of all messages within a thread and their relative sequence. For example, instead of assigning sequential message numbers, sequentially incoming messages may simply be stored in sequential memory locations and associated with a single thread ID so as to identify which of those messages are associated with a common thread. A separate variable length file, record or other organized memory element may simply be assigned to a given thread for storing all members of that thread therewithin (sequentially). Those in the art will appreciate that there are many (perhaps unlimited) possible ways to achieve a condensed message store with the above described desired attributes.

Figure 5:
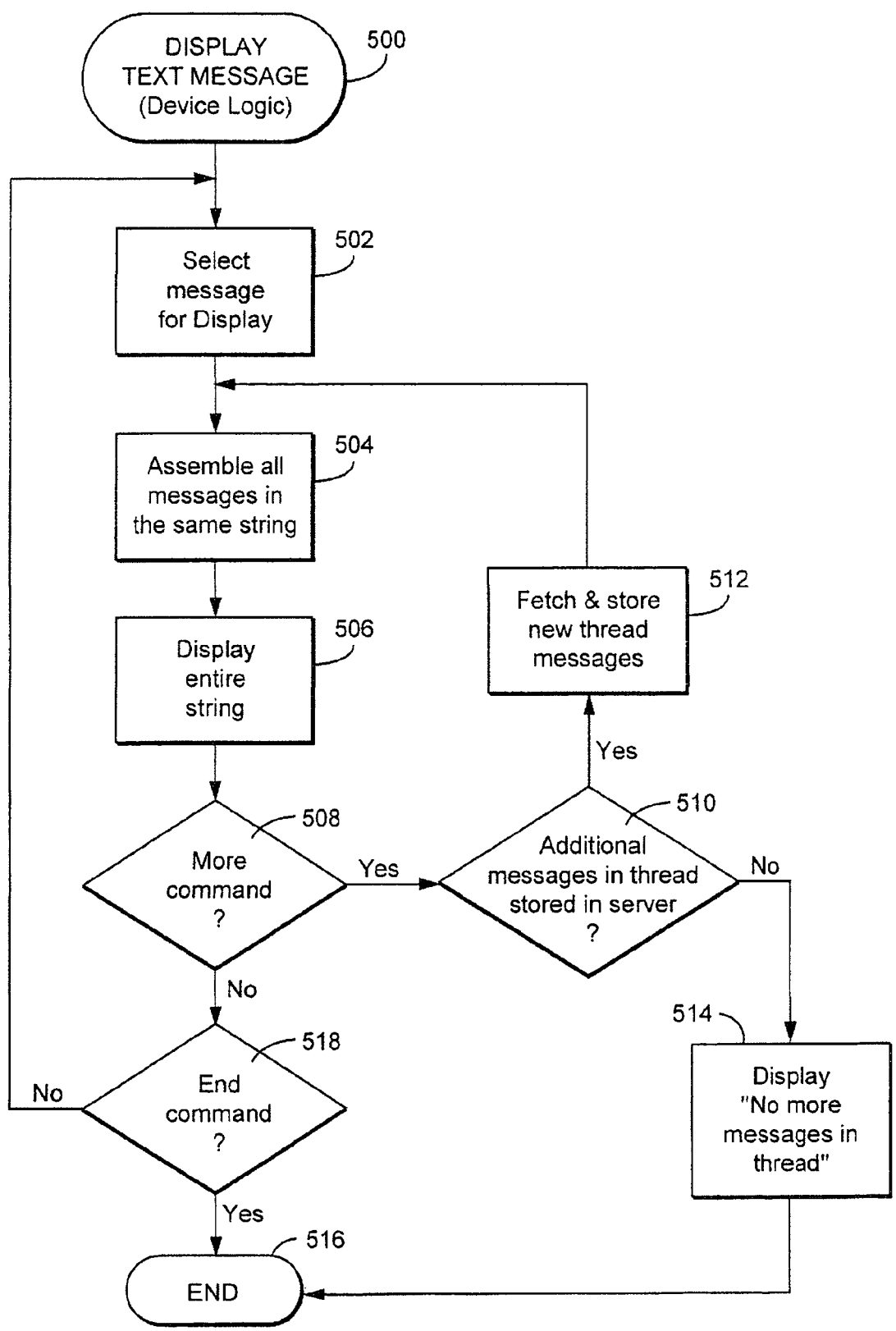
FIG. 5 is an exemplary abbreviated schematic flow diagram of computer software (i.e., program logic) that may be utilized in the device of FIG. 2 providing a first embodiment for display text message logic which assembles all messages in the same thread from the condensed message store for display.

One exemplary embodiment of display text message program logic for the wireless device may be entered at 500 in FIG. 5. Here, at 502, a new incoming message or previously stored message is selected for display (e.g., using conventional display and selection functionality). At 504, using the condensed message store structure/data content, all messages in the same thread are then assembled and the entire thread of messages is then made available for display at 506 (e.g., by conventional scrolling across the display screen if necessary). If for some reason it appears to the user that the message thread stored at the device may be missing some portion of the thread, then a MORE command may be issued at 508 to the central server. If so, then if the server indicates additional messages in the thread are available at 510, those additional messages in the thread are fetched and stored as new messages in the thread at 512 before the routine returns to step 504 previously described. If no additional messages are found at the server, then a suitable "no more messages in thread" display is provided at 514. From there, control may be transferred back to display step 506 or simply to END the routine at 516. If an END command is entered by the user (e.g., as sensed at 518), then the routine is exited at 516 as well. If not, then control is returned to step 502 for possible selection of another message for display (e.g., if some command is entered other than MORE or END).

Figure 6:
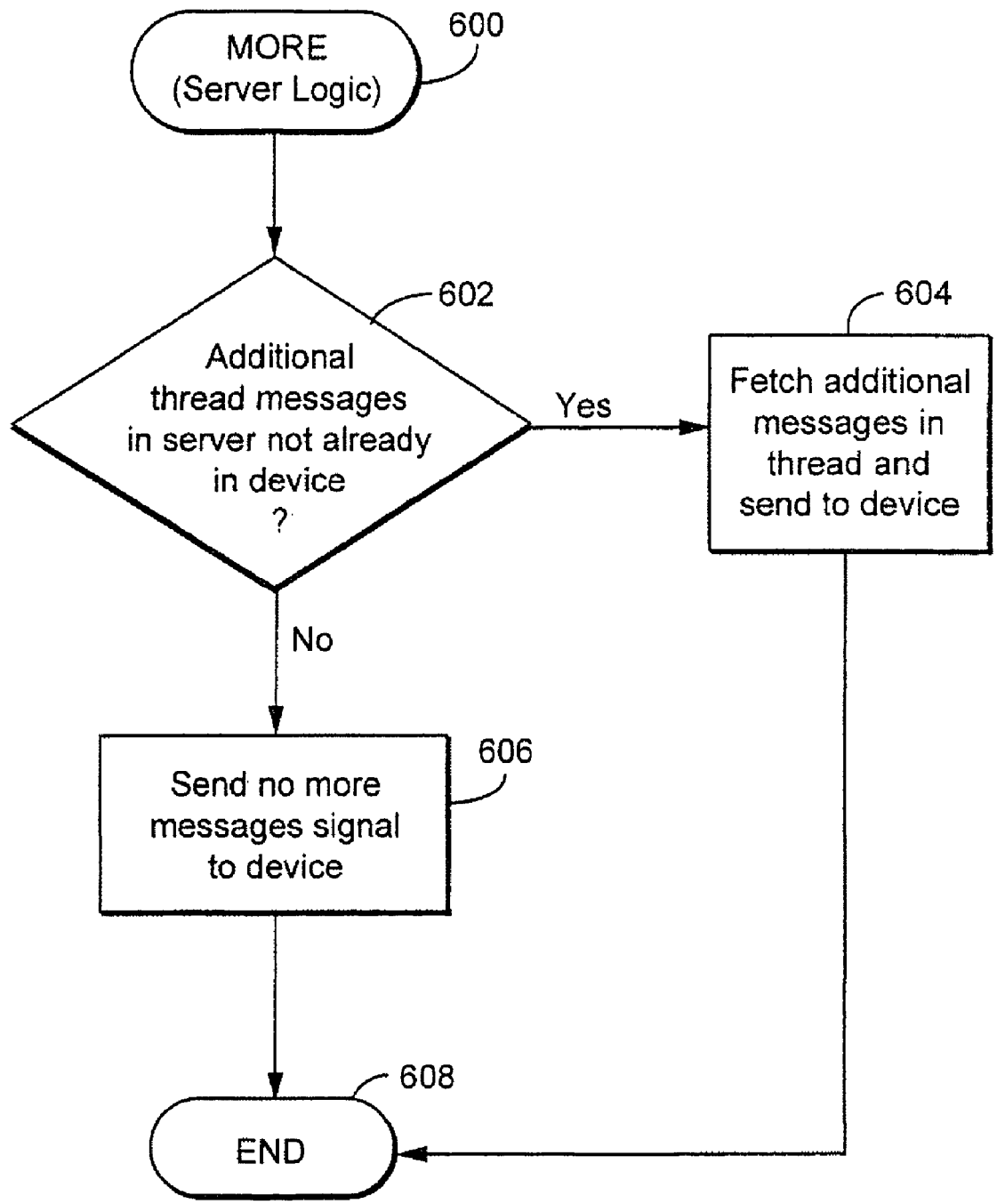
FIG. 6 is an exemplary abbreviated schematic flow diagram of computer software (i.e., program logic) that may be utilized in the server to respond to MORE requests from the wireless device.

At the server side, if a MORE command is detected, then the MORE sub-routine is entered at 600 as shown in FIG. 6. If additional thread messages are found in the server at 602, then those additional messages are fetched at 604 and sent to the device before the routine is exited at 608. If no additional thread messages are found, then a suitable indication to that effect is sent back to the device at 606 before exit is taken at 608.

Figure 7:
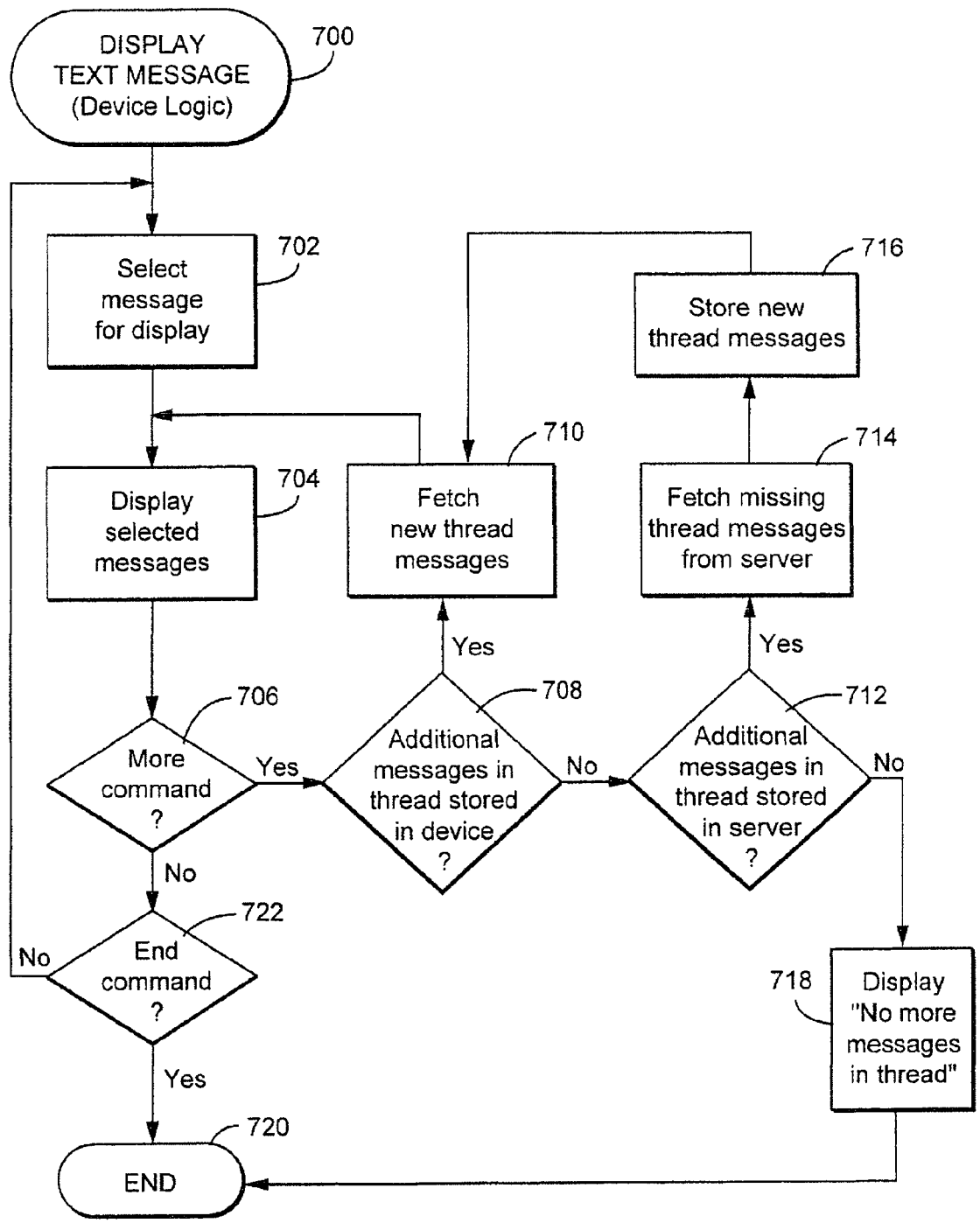
FIG. 7 is an exemplary abbreviated schematic flow diagram of computer software (i.e., program logic) that may be utilized in the device of FIG. 2 providing a second embodiment of display text message program logic for selective display of only part of a thread of messages assembled from the condensed message store.

As those in the art will appreciate, there are many possible algorithms for use with the condensed message store. One such additional exemplary program logic is depicted in FIG. 7 which is entered at 700. Here, a message (i.e., a new incoming message or a previously stored message) is selected for display at 702 and that particular message (or some other sub-set of messages less than the entire thread) is displayed at 704. If a MORE command is detected at 706, then a check is first made at 708 for additional messages in that particular thread already stored in the device. If such are found, then they are fetched at 710 from the device memory and control is returned to display step 704. However, if no additional thread messages are found already stored in the device, then control is passed to 712 where additional messages that might be stored in the server are requested from the server. If such are discovered, then they are fetched at 714 from the server and stored in the device at 716 whereupon control is passed back to step 710 to proceed as before where the new thread messages now in the device memory are fetched and added to the display at 704. However, if no additional messages are found either in the device or in the server, then a suitable "no more messages in thread" display is generated at 718 before exit is taken at 720. If an END command is issued at 722, then exit is also taken at 720. Otherwise (i.e., if any other command key is pressed by the user), then control is returned to step 702 where another message may be selected for display.

Of course a message thread can itself spawn multiple message threads. For example, in a message thread originally including Bill, Fred and Mike, Bill may have a side technical discussion with Mike, while at the same time maintaining discussion with the overall original To list. At the same time, one recipient might forward an email to his secretary for filing, or a colleague for proofing. Thus, 3 message threads (the original and 2 side threads) would be active at the same time, but all relate back to the original message. In such spawning situations, the up-thread references are still 1:1, but the down-thread references could now be 1:n, where n−1 is the number of separate message threads spawned from the current message.

Figures 8, 9:
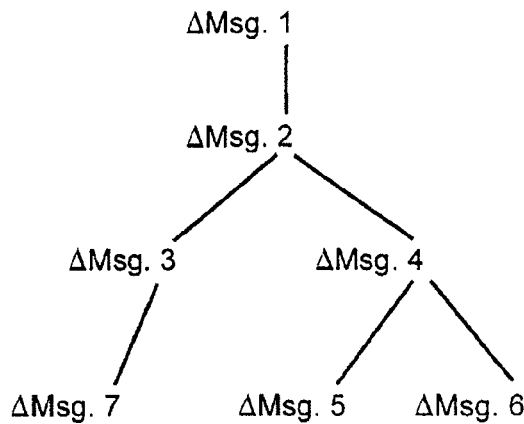
FIG. 8 is an exemplary abbreviated node diagram of a more complicated email thread where a first thread spawns multiple downstream threads.
FIG. 9 is one exemplary condensed message store organization for the more complicated email thread of FIG. 8.

One simplified exemplary situation of this nature is depicted in the nodal diagram of FIG. 8. Here an original message 1 starts out in a normal 1:1 thread to message 2. However, because one of the recipients of message 2 decides to start another sub-thread, message 4 branches out in this sub-branch which, in turn, branches once again into a sub-branch 6. By permitting multiple thread-down references as depicted in the exemplary condensed message store of FIG. 9, such more complex 1:n message thread splitting situations can be accommodated while still economizing on memory by storing each delta message text only once. As those in the art will appreciate, similar sub-thread situations can also be accommodated by suitable memory organizational structures (e.g., simply setting up additional fields in a larger record or by setting up entirely separate but cross-referenced files for each sub-thread branch).

As those in the art will be appreciate, there may be many modifications and variations made in these exemplary embodiments while yet retaining many of their novel features and advantages. Accordingly, all such modifications and variations are intended to be included within the scope of the appended claims.

What is claimed is:

1. A mobile communication device for sending, receiving and displaying text messages, each individual message associated with a thread of related messages between two or more parties, said mobile communication device comprising:
   a condensed message store for storing each individual message, and thread reference data to uniquely identify the thread and a sequence of the individual message within the thread; and
   message display logic, functionally linked to said condensed message store, to sequentially link together and display each of the individual messages associated with the thread of related messages, which are currently stored in the condensed message store, in accordance with the thread reference data, and to automatically locate and sequentially link together for display all other messages in the thread when any one message of the thread other than a last incremental message in the thread is selected for display.

2. A mobile communication device as in claim 1 wherein said thread reference data for each individual message identifies at least one of (a) thread membership and (b) message sequence within the thread.

3. A mobile communication device as in claim 2 wherein said stored thread reference data for each individual message identifies both thread membership and message sequence within the thread.

4. A mobile communication device as in claim 1 further comprising: message sending logic which, when sending a new message that is part of the thread, sends, at least initially, only that one new individual message together with thread reference data that identifies at least its thread membership.

5. A method for operating a mobile communication device for sending, receiving and displaying text messages, each individual message associated with a thread of related messages between two or more parties, said method comprising:
   maintaining, at the mobile communication device, a condensed message store for storing each individual message, and thread reference data to uniquely identify the thread and a sequence of the individual message within the thread; and
   linking together for display each of the individual messages associated with the thread of related messages, which are currently stored in the condensed message store, in accordance with the thread reference data by automatically locating and sequentially linking together for display all other messages in the thread when any one message of the thread other than a last incremental message in the thread is selected for display.

6. A method as in claim 5 wherein said thread reference data for each individual message identifies at least one of (a) thread membership and (b) message sequence within the thread.

7. A method as in claim 6 wherein said stored thread reference data for each individual message identifies both thread membership and message sequence within the thread.

8. A method as in claim 5 further comprising: when sending a new message that is part of the thread, at least initially only sending that one new individual message together with thread reference data that identifies at least its thread membership.

9. A non-transitory digital storage medium storing computer program code on a mobile communications device, which when executed, effects a method for operating a mobile communication device for sending, receiving and displaying text messages, each individual message associated with a thread of related messages between two or more parties, said method comprising:
   maintaining, at the mobile communications device, a condensed message store for storing each individual message, and thread reference data to uniquely identify the thread and a sequence of the individual message within the thread; and
   linking together for display each of the individual messages associated with the thread of related messages, which are currently stored in the condensed message store, in accordance with the thread reference data by automatically locating and sequentially linking together for display all other messages in the thread when any one message of the thread other than a last incremental message in the thread is selected for display.

10. A non-transitory digital storage medium as in claim 9 wherein said thread reference data for each individual message identifies at least one of a thread membership and a message sequence within the thread.

11. A non-transitory digital storage medium as in claim 10 wherein said stored thread reference data for each individual message identifies both thread membership and message sequence within the thread.

12. A non-transitory digital storage medium as in claim 9 further comprising:
   when sending a new message that is part of the thread, at least initially sending only that one new individual message together with thread reference data that identifies at least its thread membership.

* * * * *

UNITED STATES PATENT AND TRADEMARK OFFICE
CERTIFICATE OF CORRECTION

| | | |
|---|---|---|
| PATENT NO. | : 7,826,406 B2 | Page 1 of 1 |
| APPLICATION NO. | : 11/113306 | |
| DATED | : November 2, 2010 | |
| INVENTOR(S) | : Anthony G. Burns et al. | |

It is certified that error appears in the above-identified patent and that said Letters Patent is hereby corrected as shown below:

Column 8, claim 10, lines 54-55, delete "a thread membership and a message sequence within the thread" and insert therefor -- (a) thread membership and (b) message sequence within the thread --.

Signed and Sealed this
Twenty-third Day of August, 2011

David J. Kappos
*Director of the United States Patent and Trademark Office*